US008771827B2

(12) United States Patent
Schröer

(10) Patent No.: US 8,771,827 B2
(45) Date of Patent: Jul. 8, 2014

(54) FILM FOR CONSTRUCTION AND FILM COMBINATION

(75) Inventor: Jörn Schröer, Herdecke (DE)

(73) Assignee: Ewald Dörken AG, Herdecke (DE)

( * ) Notice: Subject to any disclaimer, the term of this patent is extended or adjusted under 35 U.S.C. 154(b) by 277 days.

(21) Appl. No.: 12/679,392

(22) PCT Filed: Sep. 24, 2008

(86) PCT No.: PCT/EP2008/008082
§ 371 (c)(1),
(2), (4) Date: Mar. 22, 2010

(87) PCT Pub. No.: WO2009/043515
PCT Pub. Date: Apr. 9, 2009

(65) Prior Publication Data
US 2010/0221515 A1   Sep. 2, 2010

(30) Foreign Application Priority Data

Sep. 26, 2007   (DE) .......................... 10 2007 046 175

(51) Int. Cl.
*B32B 7/02* (2006.01)
(52) U.S. Cl.
USPC ........ 428/212; 428/220; 428/304.4; 428/327; 528/271
(58) Field of Classification Search
USPC .................. 428/212, 220, 304.4, 411.1, 327; 528/271
See application file for complete search history.

(56) References Cited

U.S. PATENT DOCUMENTS

| 6,080,478 A * | 6/2000 | Karhuketo .................... 428/340 |
| 2004/0103603 A1 | 6/2004 | Kunzel et al. |
| 2005/0150190 A1 * | 7/2005 | Kanios ............................ 53/469 |

FOREIGN PATENT DOCUMENTS

| DE | 296 11 626 U1 | 9/1996 |
| DE | 101 11 319 A1 | 9/2002 |
| DE | 102 31 769 A1 | 2/2004 |
| DE | 102 39 985 A1 | 3/2004 |
| DE | 102 39 985 B4 | 3/2006 |
| EP | 0 816582 A1 | 1/1998 |
| EP | 1 834 762 A2 | 9/2007 |
| WO | 02/16468 A1 | 2/2002 |
| WO | WO 0216468 * | 2/2002 ............. C08G 63/91 |

OTHER PUBLICATIONS

Kuenzel (EP 0816582 machine translation), Dec. 10, 2005.*

* cited by examiner

*Primary Examiner* — David R. Sample
*Assistant Examiner* — Lawrence Ferguson
(74) *Attorney, Agent, or Firm* — Roberts Mlotkowski Safran & Cole, P.C.; David S. Safran

(57) ABSTRACT

A film (1) for construction with at least one functional layer (2) and optionally at least one other layer, especially a carrier layer and/or reinforcing layer (3), the functional layer (2) having a water vapor diffusion resistance ($s_d$ value) that is dependent on the ambient humidity. The functional layer (2) has at least one material (4) that can be obtained from a renewable raw material, especially at least one polymer based on a renewable raw material.

21 Claims, 2 Drawing Sheets

| Sd Values [m] Application | Installation | General Dry 20-55% min. | General Dry 20-55% max. | General Wet 60-95% min. | General Wet 60-95% max. | General Quotient Dry-Wet | Preferred Dry 20-55% min. | Preferred Dry 20-55% max. | Preferred Wet 60-95% min. | Preferred Wet 60-95% max. | Preferred Quotient Dry-Wet | Especially Preferred Dry 20-55% min. | Especially Preferred Dry 20-55% max. | Especially Preferred Wet 60-95% min. | Especially Preferred Wet 60-95% max. | Especially Preferred Quotient Dry-Wet |
|---|---|---|---|---|---|---|---|---|---|---|---|---|---|---|---|---|
| Vapor Control Layer | Over the Rafters Outside | 3 | 50 | 0.5 | 20 | >1,5 | 4 | 25 | 1 | 15 | >2 | 5.5 | 12 | 2 | 9 | >2,5 |
| Vapor Control Layer | Over the Rafters Inside | 2 | 30 | 0.1 | 3 | >1,5 | 2 | 15 | 0.5 | 7 | >2 | 2 | 8 | 1 | 4 | >2,5 |
| Vapor Control Layer | Over the Rafters in a Loop Shape | 1 | 10 | 0 | 1.2 | >1,5 | 1 | 5 | 0 | 0.8 | >2 | 1 | 1.8 | 0 | 0.6 | >2,5 |
| Vapor Control Layer Counter Ceiling Web | All | 1 | 75 | 0.02 | 0.5 | >2 | 1,5 | 30 | 0.02 | 0.5 | >3 | 2 | 8 | 0.02 | 0.5 | >3 |
| Counter Ceiling Web | Over the Rafters Outside + in a Loop Shape | 0.3 | 10 | 0 | 0.8 | >1,5 | 0.3 | 5 | 0 | 0.5 | >2 | 0.4 | 2 | 0 | 0.3 | >2,5 |
| Counter Ceiling Web | Over the Rafters Inside | 1 | 15 | 0 | 2 | >1,5 | 0.5 | 8 | 1 | 1 | >2 | 0.7 | 3 | 0.2 | 0.7 | >2,5 |
| Vapor Barrier | Over the Rafters Outside | 120 | 1000 | 100 | Infinite | >1,2 | 150 | 500 | 100 | Infinite | >1,5 | 150 | 300 | 100 | Infinite | >1,5 |
| Vapor Control Layer Barrier | Over the Rafters Outside or Inside | 100 | Infinite | 2 | 95 | >3 | 100 | Infinite | 5 | 60 | >4 | 100 | Infinite | 10 | 40 | >5 |

Fig. 2

FILM FOR CONSTRUCTION AND FILM COMBINATION

BACKGROUND OF THE INVENTION

1. Field of the Invention

The invention relates to a film for construction, especially a vapor control layer, a counter ceiling web and an underform web, with at least one functional layer, and optionally, at least one other layer, especially a carrier layer and/or reinforcing layer, the functional layer having a water vapor diffusion resistance ($s_d$ value) that is dependent on the ambient humidity. Moreover, this invention relates to a film combination with at least one film of the aforementioned type, and optionally, with at least one other film connected to the film and/or with at least one carrier connected to the film.

2. Description of Related Art

Heat insulation measures are known on buildings, parts and equipment in order to save energy, on the one hand, and on the other hand, to protect components against damage, for example, by condensate formation when moisture penetrates by convection or by diffusion. Therefore, control of convection and diffusion processes plays a decisive role in the construction field. In particular, insulation can thus be improved and its function can be permanently maintained.

In particular, controlling water vapor diffusion can prevent moisture damage. For this purpose, if vapor barriers with high diffusion resistance are used, the construction is indeed protected against penetrating moisture due to diffusion processes; but, vapor barriers have the disadvantage that drying of the inside is prevented or hindered. If vapor control layers with low diffusion resistance are used, redrying is possible, but there is the danger of overly great wetting as a result of diffusion processes.

In this connection, the prior art discloses films with variable water vapor permeability. Vapor control layers are preferably used here with a water vapor diffusion resistance or variable $s_d$ values that are dependent on the ambient humidity and they can also be located around the rafters in an undulating manner, for example, in the roof area in addition to installation over or under the rafters.

German Utility Model DE 296 11 626 U discloses a barrier for prevention of air convection and emission of pollutants from components in the rooms of buildings, on the room side there being a polyamide film. The film can consist of polyamide 3, 4, 6, or 12 or of a mixed polyamide. At a film thickness of 50 microns the film under measurement conditions according to DIN 52650 in a dry region at an average relative humidity of roughly 30% has a water vapor diffusion resistance ($s_d$ value) of 4.5 m and in a humid region at an average relative humidity of roughly 70% has a water vapor diffusion resistance ($s_d$) of 0.5 m of a diffusion-equivalent air layer thickness.

German Patent DE 102 39 985 B4 discloses suitable sealing strips 5 to 20 cm wide for construction engineering that are formed of at least three flat layers, the middle layer consisting of a film of an ionomer that has a lower water vapor diffusion resistance at higher relative atmospheric humidity than at a lower relative atmospheric humidity, the film at 72.5% relative atmospheric humidity having a $s_d$ value from 0.1 to 5 m and at 25% relative atmospheric humidity having a $s_d$ value from 1 to 10 m and the difference of the two values being 0.5 m or greater. The two outer layers that protect and carry the middle layer consist of the same or different material and have a $s_d$ value that is below the lowest $s_d$ value of the film. Moreover there can optionally be other layers of water vapor-permeable framing materials and/or process engineering auxiliary materials. Comonomers can be different synthetically based monomers.

German Patent Application DE 101 11 319 A1 discloses a material for a film for lining buildings or for covering components, such as walls, floors, rooves and ceilings in buildings or for a vapor control layer for heat insulation in buildings, at least some of the material consisting of polar materials and having a water vapor diffusion resistance ($s_d$ value) that is dependent on the ambient humidity. At a relative humidity in the range from 20% to 60% or 30% to 50% the $s_d$ value is 5 to 10 m diffusion-equivalent air layer thickness and at a relative humidity in the range from 50% to 95% the $s_d$ value is less than 2 m or less than 1 m diffusion equivalent air layer thickness. Some of the material can consist of a polymer in which polar ingredients such as an ionomer resin with ethylene and methacrylic acid are contained. Moreover, some of the material can consist of an ethylene-based polymer or copolymer material, such as polyethylene or polypropylene to which acrylic acid is added.

German Patent Application DE 102 31 769 A1 describes a vapor control layer film with increased breaking elongation in the lengthwise and transverse directions and with variable water vapor permeability. The vapor control layer film consists of a copolyamide, by which increased breaking elongation in the lengthwise and transverse direction of the vapor control layer film will be achieved. The vapor control layer film at an ambient atmosphere pressure of 100% and an ambient temperature of 0° C. should have a water vapor diffusion resistance in the range from 4.5 to 8 g/(m$^2$d) and at a relative humidity of the atmosphere surrounding the vapor control layer film of 85% and an ambient temperature of 23° C. should have a water vapor diffusion resistance in the range from 11 to 23 g/(m$^2$d).

The vapor control layers and films known from the prior art generally contain petrochemical-based polymers that must be disposed of after their use with high energy expenditure and with great complexity. This is associated with high costs. With petrochemical-based polymers, only amide or ionic functionalities are used.

SUMMARY OF THE INVENTION

The object of this invention is to provide a film and a film combination of the initially named type that can be produced economically with low energy use and can be easily and economically disposed of after their use, and over the function of the film or the film combination in the construction field will be essentially ensured the expected service life. Otherwise, another object of this invention is to provide a film or film combination that is characterized by high elongation.

The aforementioned objects are achieved in a first embodiment of a film of the initially named type in that the functional layer has at least one material that can be obtained from a renewable raw material, especially at least one polymer based on a renewable raw material. In one alternative embodiment, in accordance with the invention, a film of the initially named type is provided with a functional layer that has at least one biodegradable material, especially a biodegradable polymer, and the biodegradable material according to DIN EN 13432: 2000 can disintegrate upon aerobic composting of the degradable material after a composting interval of more than 12 weeks and at most 80 weeks that has been prolonged compared to DIN EN 13432:2000, a maximum 10% of the original dry weight of the biodegradable material can be found in the screen fraction of the composted material greater than 2 mm. Otherwise, the aforementioned objects are achieved by a film combination with at least one film of the aforementioned type, and optionally, at least one other film and/or at least one carrier. Compostability in the sense of the invention relates simply to the biodegradable component(s) in the film or in the film combination.

The above described film and film combination can be produced with low energy use, and after expiration of the expected service life or after use can be easily and economically disposed of. For example, when using the film or film combination in accordance with the invention in a roof or facade, in aging tests, it was shown that it does not decompose over the expected service life of up to 20-30 years, and essentially, its functionality is maintained even when the film or film combination comes into contact with condensing water over a longer time. This can be attributed to the fact that the materials that can be obtained from renewable raw materials and that are used in the film or film combination or the biodegradable materials used have a limited water absorption capacity that is related otherwise to the absence of decomposing microorganisms. The film in accordance with the invention and the film combination moreover have variable water vapor permeability and high elongation, its having been surprisingly shown that functionalities, other than amidic or ionic, can also be used if polymers are used as the material of the functional layer.

The film in accordance with the invention comprises a functional layer that, itself, can be a film or a correspondingly coated carrier, for example, and optionally, a carrier layer or reinforcing layer that is connected to the functional layer. The film can be present as a flat product, especially web-like as rolled goods, and can have a bendability or deformability that is high enough for processing in the construction field.

One embodiment of a film in accordance with the invention is explained in detail below with reference to the accompanying drawings.

BRIEF DESCRIPTION OF THE DRAWINGS

FIG. 1 is a schematic cross-sectional view of the film in accordance with the invention for construction and FIG. 2 is a tabulation of $s_d$ values in [m] for different applications of the film or the film combination in accordance with the invention and for different types of installations.

DETAILED DESCRIPTION OF THE INVENTION

Figure 1:
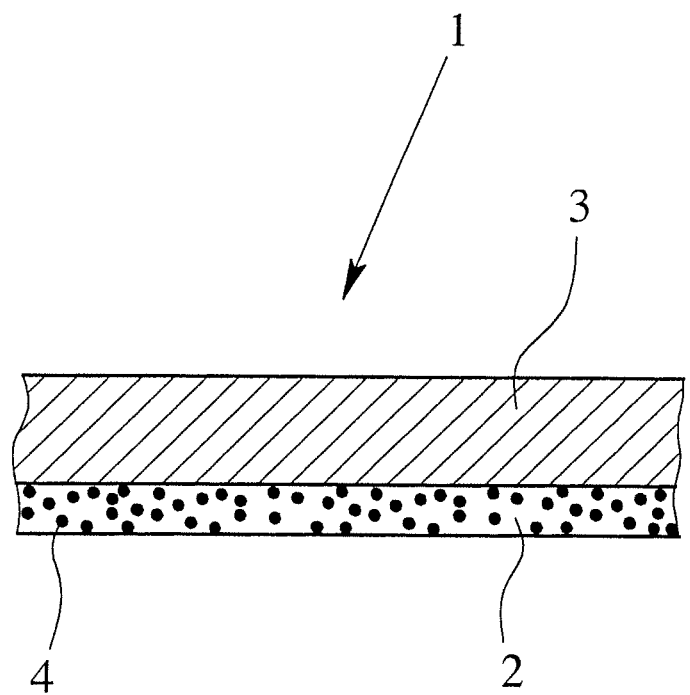

FIG. 1 is a cross-sectional view of the film 1 in accordance with the invention for construction that can be used, for example, as a vapor control layer, underform web or counter ceiling web. The film 1 has a functional layer 2 with a water vapor diffusion resistance ($s_d$ value) that is dependent on the ambient humidity and a carrier or reinforcing layer 3 that is connected to the functional layer 2.

In order to ensure production of the film 1 with low energy use and simple and economical disposal after the useful life has expired, in the film shown in FIG. 1 it is provided that the functional layer 2 has a material 4 that can be obtained from a renewable raw material and is preferably biodegradable, and the biodegradable polymer according to DIN 13432:2000 can disintegrate with aerobic composting and a prolonged composting interval of more than 12 weeks and at most 80 weeks. It goes without saying that the material that can be obtained from a renewable raw material according to DIN 13432:2000 with a correspondingly prolonged test duration can be biodegradable, as has been described above. Otherwise, it goes without saying that the functional layer can have at least one material that can be obtained from a renewable raw material and in addition optionally another biodegradable material.

The functional layer can have at least one polymer based on a renewable raw material and/or at least one biodegradable polymer or also a mixture of different polymers based on renewable raw materials and/or different biodegradable polymers. Otherwise, the functional layer can contain a mixture of biodegradable polymers and/or polymers based on renewable raw materials with conventional synthesized polymers. Preferably the polymers indicated below can be used:

| Polymer Type | Monomer or Base | Manufacturer | Trade Name |
| --- | --- | --- | --- |
| Polyesters | Butylene Adipate Terephthalate | BASF | Ecoflex |
| | Butylene Succinate Adipate | Showa | Bionolle |
| | Butylene Succinate Terephthalate | Novamont | Eastar Bio |
| | Butylene Succinate Adipate | IReChem | EnPol |
| Polyhydroxyalkanoates | Hydroxyalkanoate Hydroxybutyrate-Hydroxyhexanoate | PHB (Metabolix) | Metabolix Nodax |
| Polylactides | Aliphatic Polyesters Based on Lactic Acid | Narureworks (Cargill) | |
| Polyester Urethanes | Aliphatic Polyester Urethane | Simadzu | PEU-Enfresin |
| Polysaccharides | Starch-Based | BIOP (BioPolymer Technologies) | Biopar |
| Polysaccharides | Mixture of Corn Starch Base and Ecoflex | BASF | Ecovio |

Additives for polymers can be conventional ones, such as pigments, dyes, fillers and reinforcing substances, reinforcing fibers, stabilizers, lubricants or the like, preferably the additives can be renewable raw materials and/or substances that are biodegradable according to DIN EN 13432:2000 with a prolonged composting interval of more than 12 weeks and at most 80 weeks.

Since the film in accordance with the invention and film combination are preferably long-lived products for construction, a test interval that has been prolonged compared to DIN EN 13432:2000 of more than 12 weeks can be easily tolerated. Preferably the prolonged composting interval should be at most 60 weeks, furthermore preferably at most 48 weeks, especially at most 18 weeks. In this connection, the water vapor permeability of the functional layer and/or of the film or film combination after at least 5 years in use in construction, preferably after at least 10 years, furthermore preferably after 20 years, should be roughly 30 to 70%, preferably roughly 50%, of the water vapor permeability or the $s_d$ value in the new state of the film. Furthermore, the tearing force of the functional layer and/or of the film or film combination after at least 5 years of use in construction, preferably after at least 10 years, especially after 20 years, should be roughly 10 to 50 N/5 cm. This ensures that operation of the film in accordance with the invention or film combination should be essentially preserved over the entire service life or useful life.

The proportion of the material that can be obtained from renewable raw materials in the functional layer and/or the proportion of biodegradable material in the functional layer can be greater than 40% by weight, preferably greater than 60% by weight, furthermore preferably greater than 80% by weight, and especially greater than 95% by weight. The proportion of the material that can be obtained from renewable raw materials in the film or in the film combination and/or the proportion of biodegradable material in the film or in the film combination in this connection can be greater than 10% by weight, preferably greater than 30% by weight, furthermore preferably greater than 60% by weight, and especially greater than 95% by weight. In this way, production of the film in accordance with the invention with low energy use and its simple and economical disposal after the useful life has expired is ensured.

In order to ensure adequate processability and function of the film in accordance with the invention over the expected service life, the minimum elongation of the functional layer and/or of the film or film combination according to DIN EN 2311 should be greater than 5% by weight, preferably greater than 20%, furthermore preferably greater than 50%, and especially greater than 100%. The maximum elongation of the functional layer and/or of the film or the film combination according to DIN 12311 can be less than 1000%, preferably less than 600%, furthermore preferably less than 200%.

In order to ensure that the film in accordance with the invention or the film combination is not decomposed even upon contact with condensed water over the expected service life and essentially preserves its function, the water absorption of the functional layer and/or of the film or the film combination according to DIN 53714 at 50% relative humidity and saturation can be between 0.45 to 40%, preferably between 1.0 to 30%, furthermore preferably between 1.5 to 20%, especially between 2 to 8% or between 10 to 40%.

The functional layer and/or the film or film combination can have a thickness between 1 to 1000 microns, preferably between 2 to 500 microns, furthermore preferably between 5 to 100 microns. This ensures sufficiently high water vapor permeability. The weight per unit area of the functional layer and/or of the film or film combination can be 1 to 1000 g/m$^2$, preferably 2 to 500 g/m$^2$, furthermore preferably 5 to 100 g/m$^2$. In order to ensure sufficiently high load capacity of the film the tearing force of the functional layer and/or of the film or film combination can have a value from 10 to 1500 N/5 cm, preferably 50 to 800 N/5 cm, furthermore preferably 80 to 500 N/5 cm.

In order to be able to use the film in accordance with the invention or the film combination in construction, the functional layer and/or the film or the film combination for a static water column of at least 10 cm, preferably of at least 1 m, furthermore preferably of at least 1.5 m, should be watertight.

As has already been pointed out, the functional layer itself can be composed of different layers. Here the same or different layers can be located next to one another and/or on top of one another. For a multilayer structure, different functionalities can be combined in the functional layer. Fundamentally it is of course also possible for the functional layer to have a single-layer structure.

The film in accordance with the invention has as a further layer, preferably as a carrier layer for the functional layer, a textile layer, a fabric layer, a nonwoven layer or an optionally perforated further film. Here, the further layer is preferably formed of at least one material that can be obtained from renewable raw materials, especially from a polymer based on renewable raw materials, and/or has at least one biodegradable material, especially a biodegradable polymer, the biodegradable material according to DIN EN 13432:2000 being able to disintegrate, and upon aerobic composting of the degradable material after a composting interval of more than 12 weeks and at most 80 weeks, preferably at most 60 weeks, furthermore preferably of at most 48 weeks, especially of at most 18 weeks, which interval has been prolonged relative to DIN EN 13432:2000, a maximum 10% of the original dry weight of the biodegradable material can be found in the screen fraction of the composted material greater than 2 mm. This ensures that the film or film combination in accordance with the invention can be produced with low energy use and/or can be disposed of easily and economically.

The water vapor permeability of the further layer can be less than the water vapor permeability of the functional layer in order not to influence the water vapor permeability of the film or the film combination.

The film in accordance with the invention can be easily and economically produced by cast film extrusion, blown film extrusion, pouring and drying of emulsions or dispersions. Otherwise the film can be obtained by cementing or bonding of at least one functional layer with at least one further layer or by extrusion coating or paste coating of at least one carrier layer with at least one functional layer or by spraying at least one functional layer onto at least one carrier layer. Films or film combinations with several identical or different layers that can be located next to one another and/or on top of one another can be produced.

The film or film combination in accordance with the invention can be used as a vapor control layer with installation over the rafters running inside or outside or with installation in a loop shape over the rafters, the term "rafters" being defined as all longitudinal construction elements in the roof and facade region, preferably of wood materials. The film or film combination can be made as a vapor control layer barrier, the film or film combination acting as a vapor control layer in a humid climate and as a vapor barrier in a dry climate. Otherwise, the film and film combination can be made as a vapor control layer counter ceiling web, i.e., diffusion-open counter ceiling web in a humid climate, and a vapor control layer in a dry climate. Installation of the film in accordance with the invention and the film combination in accordance with the invention made as a counter ceiling web is possible over the rafters outside or inside or in a loop shape over the rafters. In all cases installation in a sheeted roof region or in the facade region is possible. Furthermore, the film or film combination, can also be used on concrete rooves, in wood post or lattice-type constructions in the base region. Preferred values for the water vapor permeability of the film in accordance with the invention or of the film combination are listed in the Table shown in FIG. 1.

Exemplary Embodiment 1

A cast film with a weight per unit area of 100 g/m$^2$ is extruded from a polyester with the trade name Ecoflex from BASF. At a relative humidity of 60% at 23° C., a $s_d$ value of 1.1 m is measured. In a dry region the $s_d$ value at a relative humidity of 25% is 3.5 m. The film that has been obtained in this way can be used as a variable vapor control layer with looped installation around the rafters or as a vapor control layer over the rafters inside.

Exemplary Embodiment 2

A nonwoven with a weight per unit area of 100 g/m² of needled hemp fibers is extrusion-coated with a film with a weight per unit area of 80 g/m² from a polyester with the trade name Ecoflex from BASF. At a relative humidity of 70% at 23° C. a $s_d$ value of 0.8 m is measured. In a dry region the $s_d$ value at a relative humidity of 30% is 2.5 m.

What is claimed is:

1. A film combination for construction, comprising at least one functional layer consisting of a biodegradable polymer selected from the group consisting of a biodegradable polyester, a biodegradable polyhydroxyalkanoate, a biodegradable polylactide, a biodegradable polyester urethane and a biodegradable polysaccharide, the functional layer having a water vapor diffusion resistance ($s_d$ value) that is dependent on ambient humidity, and at least one carrier or reinforcing layer, further comprising at least one additional layer that has a water vapor permeability that is less than the water vapor permeability of the functional layer.

2. The film combination according to claim 1, wherein the biodegradable polymer is disintegrateable upon aerobic composting after a composting interval of more than 12 weeks and at most 80 weeks to an extent that a maximum 10% of the original dry weight of the biodegradable polymer can be found in a screen fraction of the composted material greater than 2 mm.

3. The film combination as claimed in claim 2, wherein the composting interval is at most 60 weeks.

4. The film combination as claimed in claim 2, wherein the composting interval is at most 18 weeks.

5. The film combination as claimed in 1, wherein the functional layer has a water vapor permeability duration of at least 30% of the water vapor permeability in the new state of the functional layer for at least 5 years in use in construction.

6. The film combination as claimed in claim 1, wherein the functional layer has a water vapor permeability durability of at least 50% of the water vapor permeability in the new state of the functional layer for at least 20 years in use in construction.

7. The film combination as claimed in claim 1, wherein the functional layer has tearing force durability of at least 10 to 50 N/5 cm for at least 5 years of use in construction.

8. The film combination as claimed in claim 1, wherein the proportion of the biodegradable material in the functional layer is greater than 95% by weight.

9. The film combination as claimed in claim 1, wherein the functional layer has a minimum elongation of according to DIN EN 12311 that is greater than 5%.

10. The film combination as claimed in claim 1, wherein the functional layer has a minimum elongation of according to DIN EN 12311 that is greater than 100%.

11. The film combination as claimed in claim 10, wherein the functional layer has a maximum elongation according to DIN 12311 that is less than 1000%.

12. The film combination as claimed in claim 9, wherein the functional layer has a maximum elongation according to DIN 12311 that is less than 200%.

13. A The film combination as claimed in claim 1, wherein the functional layer has a water absorbance according to DIN 53714 at 50% relative humidity and saturation of 0.45 to 40%.

14. The film combination as claimed in claim 1, wherein the functional layer has a thickness of 1 to 1000 microns.

15. The film combination as claimed in claim 1, wherein the functional layer has a thickness of 5 to 100 microns.

16. The film combination as claimed in claim 1, wherein the functional layer has weight per unit area of 1 to 1000 g/m².

17. The film combination as claimed in claim 1, wherein the functional layer has a tearing force of 10 to 1500 N/5 cm.

18. The film combination as claimed in claim 1, wherein the functional layer is watertight for a static water column of at least 10 cm.

19. The film combination as claimed in claim 1, wherein the functional layer is formed of several layers.

20. The film combination as claimed in claim 1, wherein the carrier or reinforcing layer is at least one of a textile layer, a fabric layer, and a nonwoven layer.

21. The film combination as claimed in claim 1, wherein the functional layer is bonded to the additional layer.

* * * * *